Patented Sept. 9, 1952

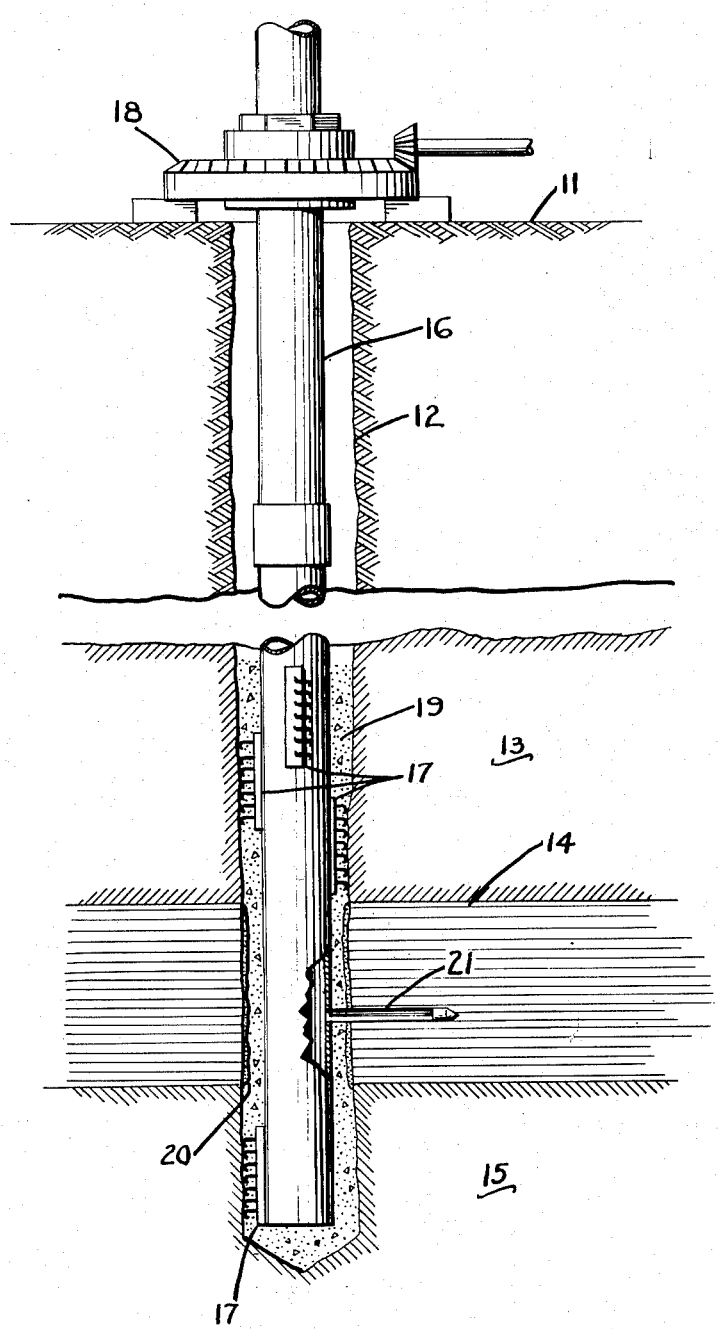

2,609,881

UNITED STATES PATENT OFFICE 2,609,881

CEMENTING WELLS

William M. Warren, Ulysses, Kans., assignor to Stanolind Oil and Gas Company, Tulsa, Okla., a corporation of Delaware Application November 27, 1948, Serial No. 62,366

9 Claims. (Cl. 166—22)

This invention pertains to the art of producing wells and, more particularly, to preparing wells for the production of desired fluids such as oil, gas, or the like while preventing the flow of other fluids into the well.

It is well known in the field of oil production that the various formations encountered in a well are generally laden with fluid at pressures which in general increase with depth, and that the major part of such formations produce fluid which has no commercial value, namely, water, brine, and the like, and which fluids are contaminants to the desired petroliferous products. Accordingly, it has become common practice to seal off the undesired formations by placing in the freshly drilled well a tubular string of pipe conventionally called casing, after which a slurry of cement thin enough to be readily pumpable is forced by pump pressure down through the tubular string to the bottom of the well, and up through the annular space between the well wall and the string towards the surface. Finally, the cement pump is stopped, flow of the slurry ceases, and the slurry proceeds to set, thus forming a seal, which in conjunction with the tubular string prevents flow of the undesired fluids into the well.

This procedure works well in a large number of cases but has certain definite disadvantages. In the first place, in the normal drilling of a well by the rotary method, drilling mud is circulated through the well which builds up a fairly thin, relatively impermeable filter cake on the walls, furnishing a temporary seal against flow of fluids into the well formations. This is obviously desirable while drilling is taking place, but it has been found difficult in many cases to secure a good seal or bond between the subsequently placed tubular string and the formations when this filter cake is present. It has therefore been found desirable on the basis of experiments to displace this filter cake as far as possible, in order to enable adequate sealing of the undesired formations. If this is not accomplished, the well is very often ruined commercially, since connate water from upper formations or lower formations, as the case may be, can force its way through a poor cement seal and be produced with the oil or gas, thus giving a serious problem as far as separation and lifting costs are concerned. Such fluids may also enter the formation or formations holding desired fluids (hereafter called producing formations) if the pressure is above producing-formation pressure and may actually dam off the producing formation. It is well known that it is extremely undesirable to permit water and, more particularly, brine, to enter a producing formation, since this tends to decrease the permeability of the formation. Water filtered from cement slurry may contain enough fine cement to seal the formation. Shales may swell on encountering relatively fresh water, closing fluid passage. Again, it is possible that some of the desired fluids may not be produced to the surface but may bypass back of the tubular string to low-pressure formations. Accordingly, it is highly essential that the best possible cement job take place.

The walls of the well can be abraded by fluid jets, scratchers, or the like, attached by welding or other means to the tubular string, which is rotated with the string after the string has been located in the well. This abrading or scratching of the mud cake loosens it from the walls so that it can be displaced upwardly and out of the well by the cement slurry as it is being forced into the well. However, while this abrading or scratching tends to remove one of the hazards present in cementing or sealing the tubular string in place by permitting a much stronger bond to form, when using ordinary cement slurries it results in what may be a far more serious difficulty. Such a cement slurry contains much more water than does the cement mixture used for normal construction purposes. As soon as the relatively porous formations have been exposed by the abrading and removal of the mud cake, the water in the cement slurry can filter into the formation. Obviously, the cement slurry is maintained under sufficient pressure so that well fluids will not be produced into the well. Accordingly, there is sufficient pressure on the slurry to cause the water in this slurry to flow through the porous earth formations. This tends to dehydrate the cement slurry, which causes it to fail to have sufficient water of hydration so that it can set satisfactorily in many cases. Even if it does set satisfactorily, two further difficulties may be encountered.

These take place if the desired producing formation is exposed during the drilling and this formation is to be cemented. This is by now common practice, the casing being placed opposite the producing formation and cemented in, the casing and cement being subsequently perforated by one or more explosively propelled bullets or the like, which provides a passage through the tubular string, and the set sealing fluid into the formation. One difficulty arises from the fact that, when ordinary cement slurry is placed opposite a producing formation which has been abraded by scratchers, the cement bond which is formed is much better than that encountered in a non-abraded well. It is much more difficult to form the passage through the bond, and it is frequently necessary to shoot a large number of shots if any success in producing this formation is to be achieved at all. Occasionally it is necessary to remove the casing and cement by subsequent drilling in order to produce from the formation after the scratching and cementing took place. The other difficulty results from the fact that the producing formation has been penetrated by the water from the cement slurry, which thereupon tends to decrease the permeability to the flow of hydrocarbons and effectively form a fluid dam adjacent the well bore, cause cementation, shale swelling, and the like.

It is immediately apparent that any decrease in permeability of the producing formation adjacent the boundary of the well has a very marked effect on the rate of production from the well. It has been determined that water from a cement slurry may filter anywhere from ½ inch to of the order of 2 feet or more into the formation and may, in a typical case, decrease the permeability of the penetrated zone by as much as 20 percent or more. Since the major drop in pressure through the fluid formation into the well occurs immediately adjacent the well bore, the decrease in permeability at this point both raises the pressure drop necessary to produce a given quantity of fluid and decreases the area through which this fluid can flow. It is apparent, therefore, that this filtration of water from the cement slurry into the well is exceedingly harmful and should be prevented if it is possible.

I have found that it is possible to secure the advantages of forming an excellent seal of formations containing undesired fluids without decreasing the production rate of producing formations, which forms the basis of this invention. This consists briefly in abrading the walls of the well only at locations other than opposite producing formations, after which the cement slurry or other sealing fluid is forced between the tubular string and the walls of the well to displace the abraded mud cake and to seal the string to the walls. Thus, opposite the producing formation or formations, there is formed a much less effective bond and one which permits a passage to be formed therethrough with greatly increased facility. At the same time, the deliberate omission of the removal of the mud cake opposite the producing formations has maintained a relatively impervious condition into the producing formation or formations.

I can enhance these results by the use of a special type of cement, namely, a low-water-loss cement. Such a cement when formed into a slurry ready for use in pumping into the well has a water-loss of approximately 100 milliliters or less in thirty minutes, employing the filtration apparatus and procedure described in the API Code No. 29, Second Edition, July 1942, "Standard Field Procedure for Testing Drilling Fluids" (Tentative), Section V. One such a low-water-loss cement can be made, for example, by the use of 1,000 grams of high-early-strength cement, to 10 grams of polyvinyl alcohol, and 1 gram of tributyl phosphate. Another composition uses 1,000 grams high-early-strength cement, to 15 grams of prehydrated starch, and 20 grams of sodium hydroxide. These would be used to form a slurry by using approximately 7 gallons to 8 gallons of water per sack of cement. Other similar low-water-loss cements may be employed, the particular type of low-water-loss cement being employed forming no part of this invention. It should be mentioned that the water-loss of conventional cement slurries of the types employed at the present time, when measured in the same type of apparatus, is of the order of 10 to 40 times as great. The employment of the low-water-loss cement in the sealing or cementing of the tubular string in a well of abraded or scratched walls prevents dehydration of the cement slurry and thus prevents the slurry thickening, causing plug flow, stuck pipe, and poor seals. Also, the cement slurry being essentially in the same fluid state when placed as when mixed, it is very effective in displacing the mud and abraded mud cake ahead of it out of the well, thus insuring that the cement can bond to the formation and to the tubular string.

One example of the procedure employed in accordance with this invention is shown in the attached Figure 1, which represents a cross section of earth formations penetrated by a well, these formations including one producing formation, while other formations contain undesired materials such as connate water. It is to be understood that the figure is presented for purpose of illustration and not by way of limitation on the procedures which may be carried out.

In this figure, the earth 11 has been penetrated by a well 12 penetrating through earth formations 13, 14, and 15. Formations 13 and 15 contain undesired fluids such as connate water, while formation 14 is an oil-bearing or producing formation. A tubular string 16 is to be cemented into the well 12. The depth of the formation such as 13 to 15 is known and the depth at which the bottom of the tubular string 16 will occur in the well is also known. Therefore, it is possible to determine before the string 16 is placed in the well the location for the abraders or scratchers 17. Such abraders are well known in the art. The abraders 17 are affixed to the tubular string 16, for example, by welding, being positioned along the string such that upon placing the string in the well these abraders 17 are located along a substantial vertical distance adjacent the well walls of the formations 13 and 15 but are not positioned opposite the oil-bearing formation 14. The tubular string is then placed in the well through the rotary table 18 in the conventional manner, care being taken to keep track of the location of the lower end thereof so that it is possible to determine when the scratchers occupy the position shown in Figure 1. When the casing has reached this position, the rotary table 18 is started, which rotates the tubular string 16, thus causing the abraders or scratchers 17 to agitate the drill mud and abrade the mud cake. Conventional connections are made to the upper end of the tubular string 16 through the usual gooseneck swivel (not shown), and cement slurry is pumped into the well through the tubular string 16. This cement slurry displaces the drill mud and the abraded mud cake towards the surface, while the cement slurry gradually takes its place. Thus, at the conclusion of this cementing operation, cement occupies the annular space 19 between the string and the walls of the formations 13, 15, etc., while opposite the producing formation 14 there is still present the mud cake 20 as well as the cement.

After the cement has been set, the rotary table 18 is removed, the conventional wellhead apparatus is placed in accordance with standard practice, and the well is completed by perforating the tubular string 16, the cement in the annulus 19, the mud cake 20, and the producing formation 14, thus providing a passage 21 through from the producing formation 14 to the interior of the tubular string 16. In the illustration a portion of the tubular string 16 has been shown broken away opposite the location of one passage 21 for convenience in illustration.

The fluids from formation 14 will pass through the various passages 21, which may be as many as desired, into the interior of the tubular string 16, from which they normally are removed to the surface through the tubing (not shown). This is entirely conventional.

It is apparent that as an alternative to placing scratchers or abraders 17 opposite the entire length of the formations containing undesired fluid that I can place a lesser number of scratchers, or use centralizing or circumferential scratchers and move the rotating tubular string 16 up and down to accomplish the same general abrading purpose. Of course, in this case, if the well penetrates a distance below the producing formation, such as formation 15, it is necessary to take precautions to insure that any scratchers below the formation are not pulled up opposite the producing formation or formations during this procedure.

It is apparent that by the steps which I have outlined the tubular string can be placed in the well, the walls of the well can be abraded at locations opposite only the formations from which there is to be no subsequent production of fluid, after which a sealing fluid can be forced between the string and the walls to displace the abraded mud cake and to cement the string to the walls so that the string is bonded to one or more well formations adjacent the producing formation. It is also possible to provide a passage through the set sealing fluid opposite the formation so that the desired fluid can be produced into the well. This same procedure can be carried out in accordance with my invention if no formations below the producing formation are penetrated by placing abraders on the tubular string but leaving blank the lowest part of the string for a distance equal to the thickness of the producing formation exposed, and locating the lower end of the casing at the bottom of the well. In this case, the passage from the producing formation to the well can be accomplished by perforating the cement set opposite the producing formation with the assurance that no water dam has been placed in the formation by filtration from the cement slurry passing thereby because the mud cake was never removed from this formation. Further variations in the operations will be apparent to those skilled in the art. The invention is not limited by the illustrations or description which has been given, but is best described by the appended claims.

I claim:

1. A method of cementing a tubular string in a well drilled while employing drilling mud whereby a mud cake is formed on the walls of the well, said well penetrating a producing formation, comprising the steps of removing by abrading a substantial portion of said mud cake from said walls only at zones other than at said formation, placing a sealing fluid on said walls at both zones and said formation, and permitting said sealing fluid to set.

2. A method according to claim 1 including the step of removing part of said set sealing fluid and said mud cake at said formation whereby said formation is exposed to said well.

3. A method of cementing a tubular string in a well penetrating a producing formation, said well having a mud cake formed on the walls thereof, comprising the steps of placing said string in said well, abrading the walls of said well at locations only other than at said formation (including the walls adjacent said formation) to abrade the mud cake from said walls, and forcing a sealing fluid between said string and said walls to displace the abraded mud cake and to cement said string to said walls, said sealing fluid being permitted to set before removing at least a part thereof at said formation to permit the production of fluid from said formation.

4. A method of cementing a tubular string in a well drilled while employing drilling mud whereby a mud cake is formed on the walls of the well, said well penetrating a formation containing a desired fluid, comprising the steps of attaching wall scratchers to the outside of said string, placing said string in said well and abrading the walls of said well immediately adjacent said formation while maintaining without abrading the walls of said well at said formation to remove at least part of the mud cake from said walls, forcing a sealing fluid between said string and said walls to displace the abraded mud cake and to cement said string to said walls, permitting said sealing fluid to set, and providing a passage through at least part of the set sealing fluid and said mud cake opposite said formation whereby said desired fluid may be produced into said well.

5. A method of cementing a tubular pipe string in a well penetrating at least one formation containing a desired fluid, there being a mud cake on the walls of said well, comprising the steps of attaching wall scratchers to the outside of said string, placing said string in said well and scratching the walls of said well only at locations other than at said formation including said well walls immediately adjacent said formation to abrade the mud cake from said walls, forcing a slurry of low-water-loss cement between said string and said walls to displace the abraded mud cake permitting said slurry to set, whereby said string is bonded to said walls at zones other than at said formation, and providing a passage through at least part of the set cement and said mud cake at said formation whereby said desired fluid may be produced into said well.

6. A method of making impervious part of the walls of a well penetrating a formation containing a desired fluid, said well having been drilled while employing drilling mud whereby a mud cake is formed on the walls of said well, while preventing substantial filtration of fluids from cement slurry into said formation comprising providing a tubular string with external wall scratchers positioned along said string such that upon placing said string in said well said scratchers are located along a substantial vertical distance adjacent said well walls other than at said formation, placing said string in said well, moving said string whereby the scratchers abrade the well walls other than those of said formation only, cementing said casing to said well walls, and providing a passage through at least part of the cement and mud cake opposite said formation whereby said desired fluid may be produced into said well.

7. A method of making impervious part of the walls of a well penetrating a producing formation the walls of said well being covered with a mud cake for a substantial length including the walls at the producing formation comprising providing a tubular string with external wall scratchers positioned along said string such that upon placing said string in said well said scratchers are located along a substantial vertical distance adjacent said well walls only other than at said formation, placing said string in said well, moving said string whereby the scratchers abrade the well walls other than those of said formation including said well walls immediately adjacent said formation, forcing a slurry of low-water-loss cement between said string and said walls to displace the abraded mud cake, permitting said slurry to set, whereby said string is bonded to said walls at zones other than at said formation, and removing at least part of the set cement and said mud cake opposite said formation whereby its fluid may be produced into said well.

8. In the method of cementing casing penetrating a first formation producing desired fluid and a second formation producing a contaminating fluid, the improvement which comprises applying a mud sheath to the faces of said formations, selectively removing the mud sheath from the face of the contaminating formation by abrading said face of said contaminating formation while retaining the mud sheath adjacent the producing formation, placing a slurry of low-water-loss cement adjacent the so exposed formation and the formation protected by the mud sheath, permitting the low-water-loss cement to set whereby the cement is bonded only to the exposed formation, and subsequently providing a passage through the set cement and said mud sheath adjacent the first formation whereby the desired fluid is produced from the region of the retained mud sheath.

9. In the method of completing a well which penetrates a first formation containing a desired fluid and a second formation containing a contaminating fluid, the steps which comprise placing a mud sheath on the exposed portions of said formations, manipulating said casing to remove the mud sheath only from the second formation containing the contaminating fluid by abrading action, cementing the casing adjacent said formations without substantially penetrating the pores of the formation protected by the mud sheath, perforating the casing and cement adjacent only the first formation, removing at least part of the mud sheath on the face of the first formation, and producing the desired fluid from the said first formation.

WILLIAM M. WARREN.

REFERENCES CITED

The following references are of record in the file of this patent:

UNITED STATES PATENTS

| Number | Name | Date |
|---|---|---|
| 2,033,562 | Wells | Mar. 10, 1936 |
| 2,335,387 | Cantin | Nov. 30, 1943 |
| 2,374,317 | Wright | Apr. 24, 1945 |
| 2,392,352 | Wright | Jan. 8, 1946 |
| 2,421,434 | Reistle et al. | June 3, 1947 |